(12) United States Patent
McGehee et al.

(10) Patent No.: US 6,705,363 B2
(45) Date of Patent: Mar. 16, 2004

(54) LOG PROCESSOR AND METHOD

(76) Inventors: Ronald W. McGehee, 3450 N. State St., Ukiah, CA (US) 95482; Rory M. Mitchell, 393 Oak Knoll Rd., Ukiah, CA (US) 95482

(*) Notice: Subject to any disclaimer, the term of this patent is extended or adjusted under 35 U.S.C. 154(b) by 0 days.

(21) Appl. No.: 09/835,944

(22) Filed: Apr. 16, 2001

(65) Prior Publication Data

US 2002/0074062 A1 Jun. 20, 2002

Related U.S. Application Data

(60) Provisional application No. 60/198,151, filed on Apr. 17, 2000.

(51) Int. Cl.[7] .................. B23Q 15/00; B27L 5/02; B27C 5/02; B27M 1/08
(52) U.S. Cl. .................. 144/357; 83/71; 83/365; 83/367; 83/438.1; 144/3.1; 144/39; 144/245.2; 144/246.1; 144/248.1; 144/369; 144/382; 144/402; 250/559.22; 356/635; 700/167
(58) Field of Search .................. 356/3.03, 3.07, 356/625, 635; 250/559.23, 559.22; 700/167, 213; 703/2, 6; 382/141; 83/71, 361, 365, 370, 438.7, 367; 144/3.1, 39, 242.1, 245.2, 246.1, 248.5, 367, 369, 377, 378, 357, 382, 402

(56) References Cited

U.S. PATENT DOCUMENTS

| | | |
|---|---|---|
| 1,263,443 A | 4/1918 | Lien |
| 4,144,782 A | 3/1979 | Lindstrom |
| 4,373,563 A | 2/1983 | Kenyon |
| 4,449,557 A | 5/1984 | Mäkelä et al. |
| 4,485,861 A | 12/1984 | Nilsson, deceased et al. |
| 4,548,247 A | 10/1985 | Eklund |
| 4,572,256 A | 2/1986 | Rautio |
| 4,583,576 A | 4/1986 | Rautio |
| 4,599,929 A | 7/1986 | Dutina |
| 4,690,188 A | 9/1987 | Hasenwinkle |
| 4,881,584 A | 11/1989 | Wislocker et al. |
| 4,947,909 A | 8/1990 | Stroud |
| 5,148,847 A | 9/1992 | Knerr |
| 5,320,153 A | 6/1994 | Knerr |
| 5,400,842 A | 3/1995 | Brisson |
| 5,435,361 A | 7/1995 | Knerr |
| 5,469,904 A | 11/1995 | Kontiainen |
| 5,722,474 A | 3/1998 | Raybon et al. |
| 5,761,979 A | 6/1998 | McGehee |
| 5,765,615 A | 6/1998 | Chapman et al. |
| 5,870,936 A | 2/1999 | McGehee |
| 5,884,682 A | 3/1999 | Kennedy et al. |
| 5,907,986 A | 6/1999 | Buchacher |
| 5,946,995 A | 9/1999 | Michell et al. |
| 6,062,281 A | 5/2000 | Dockter et al. |

FOREIGN PATENT DOCUMENTS

| | | |
|---|---|---|
| CA | 2022857 | 2/1992 |
| DE | 33 47 584 A1 | 7/1985 |
| GB | 2 068 294 A | 8/1981 |

*Primary Examiner*—W. Donald Bray
(74) *Attorney, Agent, or Firm*—Antony C. Edwards

(57) ABSTRACT

A log processor and log processing method scans a log (L) at a first station (18) so that the longitudinal centerline (32) and a sawing scheme for the log can be automatically determined by a controller (4). The log is oriented at a second station (24) so that the longitudinal centerline is oriented with respect to a vertical plane passing through the feed line. The position of the log is automatically adjusted at third and fourth stations (36, 42) so that the saw blade path (56) through the log is generally parallel to the feed line as the log passes a log exit (12) and through a saw (14). The sawing scheme can include variable tapering sawing from split taper sawing to full taper sawing. Differential steering chain assemblies (37) may be used at the fourth station and may each include continuous loop, log-engaging chains (106) which engage the log above and below the log. Log chipping, profiling heads (62) may be used on either side of the feed line, such as at a fifth station. The log is preferably stabilized at the log exit.

30 Claims, 13 Drawing Sheets

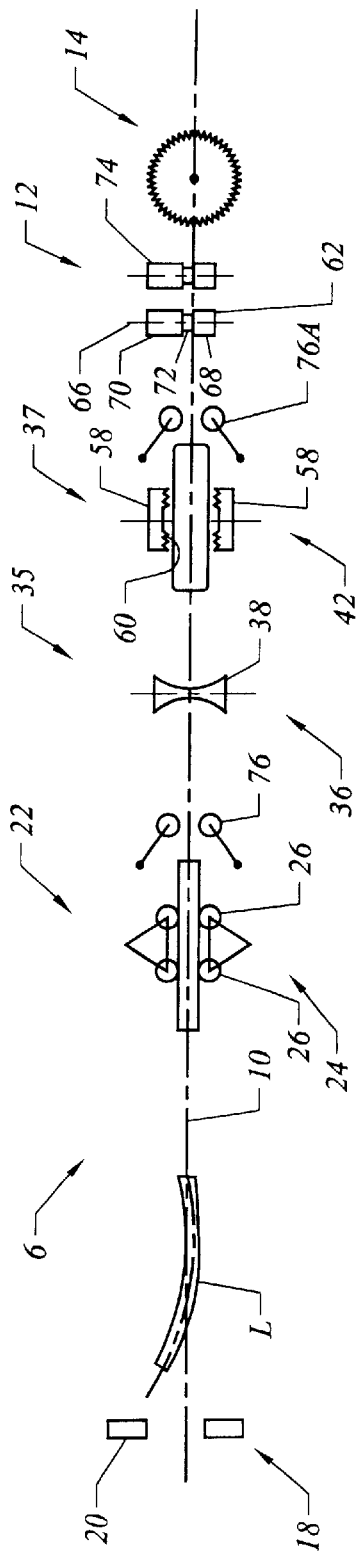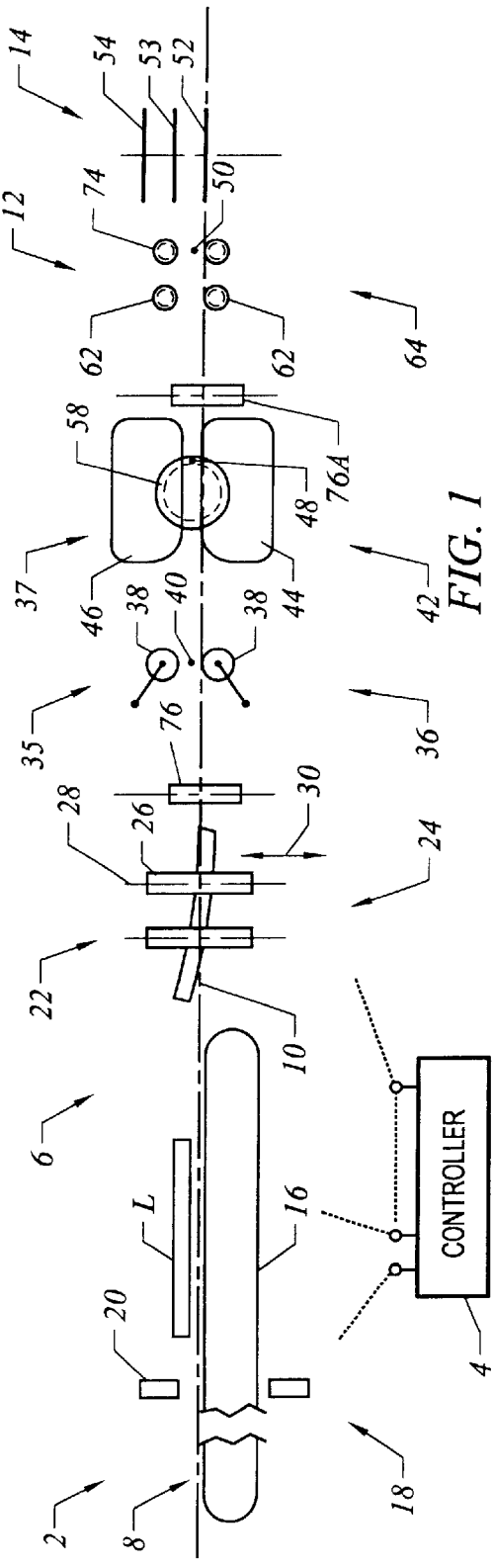
FIG. 1A
FIG. 1

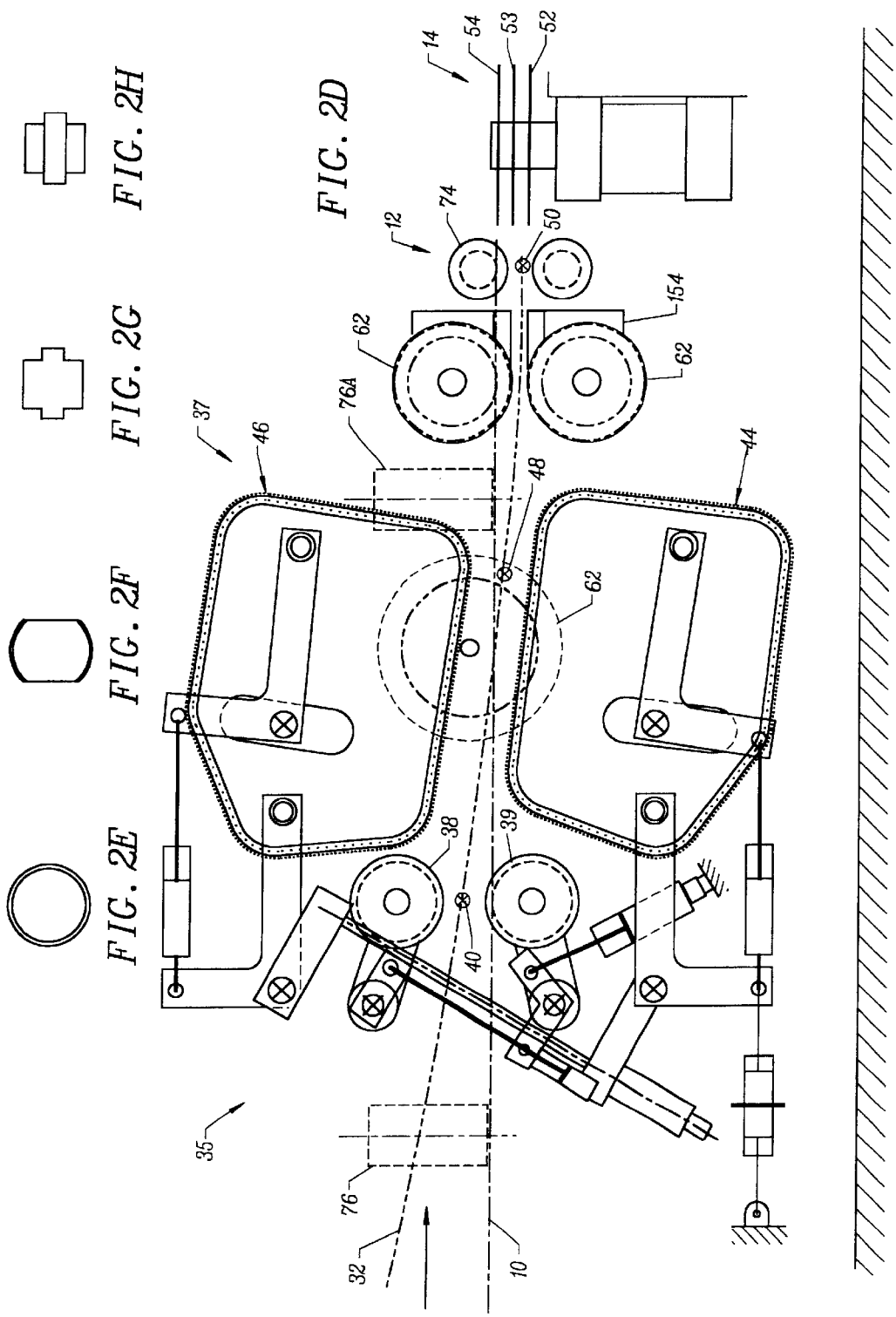

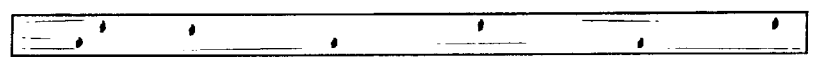
*FIG. 10A*
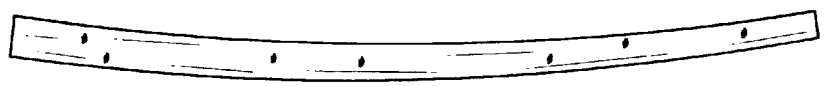
*FIG. 10B*
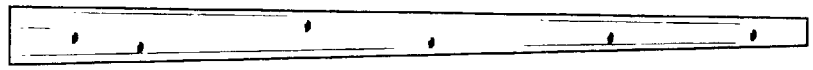
*FIG. 10C*
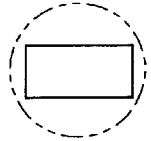    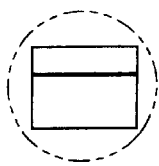    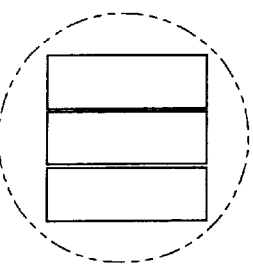
*FIG. 11A*    *FIG. 11B*    *FIG. 11C*
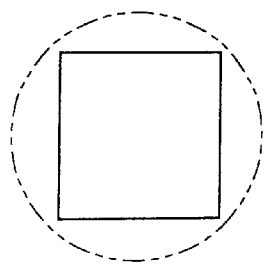    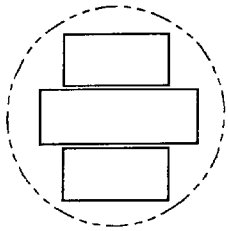    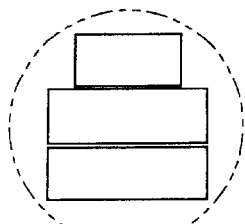
*FIG. 11D*    *FIG. 11E*    *FIG. 11F*

LOG PROCESSOR AND METHOD

CROSS-REFERENCE TO RELATED APPLICATION

This application claims the benefit of U.S. patent application Ser. No. 60/198,151 filed Apr. 17, 2000.

BACKGROUND OF THE INVENTION

Trees used to create lumber and other wood products may be straight, curved, also called swept, or tapered, or a combination of the three. Much work has been done to maximize the board feet of lumber that can be obtained from imperfect logs, in particular ones which are tapered and curved. These problems are especially acute when smaller diameter logs are used. A number of issued patents attempt to address the problems of curved and tapered logs. See, for example, U.S. Pat. Nos. 5,761,979; 4,239,072; 4,449,557; 5,816,302; 5,853,038; and 5,946,995. See also U.S. patent application Ser. No. 09/792,891 filed Feb. 23, 2001, which claims the benefit of provisional patent application No. 60/184,422 filed Feb. 23, 2000. Controllers have been developed to control these complicated saw milling equipment. See, for example, U.S. Pat. No. 5,884,682.

SUMMARY OF THE INVENTION

The present invention is directed to a log processor and log processing method which permit optimal production of sawed products from logs which are straight, curved, tapered, or a combination thereof, quickly and effectively.

A first aspect of the invention is directed to a log processing method during which a log is passed along a feed line from a log entrance to a log exit. The log is scanned at a first station. The longitudinal centerline and a sawing scheme for the log are automatically determined by a controller based at least in part on the results of the scanning step. The sawing scheme includes a saw blade path through the log which often is but may not be parallel to the longitudinal centerline of the log. The log is oriented at a second station along the feed line so that the longitudinal centerline is oriented with respect to a chosen plane. A chosen plane is typically a vertical plane passing through the feed line. The log is engaged at third and fourth stations along the feed line. The position of the longitudinal centerline of the log relative to the feed line and the chosen plane is automatically adjusted so that the saw blade path of the log at the log exit is generally parallel to the feed line as the log passes the log exit. The log is driven past a saw at or adjacent to the log exit to create the board or other sawed product.

The sawing scheme can include variable tapering sawing from split taper sawing to full taper sawing. The position-adjusting step may include the use of generally hourglass-shaped differential centering rolls at the third station and differential steering chain assemblies at the fourth station. The differential steering chain assemblies may each include continuous loop, log-engaging chains having log-engaging sections which engage the log, typically above and below the log. Log chipping, profiling heads may be used on either side of the feed line, such as at a fifth station. The log is preferably stabilized at the log exit.

Another aspect of the invention is directed to a log processor including a controller and log conveyor assembly operably coupled to the controller. The log conveyor assembly includes a log entrance, at which a log is introduced to the conveyor assembly at one end of a feed line, and a log exit, at the other end of the feed line. The assembly includes a log scanner at a first station which determines a longitudinal centerline and a sawing scheme for the log. The sawing scheme includes a saw blade path through the log. A log orienting assembly is at second station and is configured to orient the scanned log to a chosen orientation with a longitudinal centerline of the log oriented with respect to, and typically aligned with, a chosen plane. The assembly further comprises first and second log positioners at third and fourth stations along the feed line. The log positioners continuously position the log as the log passes through the third and fourth stations so that as the log passes the log exit, the saw blade path is generally parallel to the feed line to help ensure the log is fed properly into a saw located at or adjacent to the log exit.

The first log positioner may include first and second differential centering rolls coupled by a linkage assembly so that the centering rolls move in equal amounts but in opposite directions; this permits the longitudinal centerline to remain centered between the centering rolls as the diameter of the log changes. The second log positioner may include first and second chain assemblies moveably mounted to the frame, each chain assembly including a chain support, a continuous loop, log-engaging chain mounted to the chain support, and an angular orientation assembly supportably mounting the chain assembly to the frame. The second log positioner may also include a differential gap assembly coupling the angular orientation assemblies to one another and biasing the log-engaging sections towards an initial separation. The log processor may also include log chippers located on opposite sides of the feed line. One type of log chipper may include side chipping heads located at the fourth station having effectively flat cutting faces oriented at least generally parallel to the chosen lane. Another type of log chipper may include profiling heads located at a fifth station, at least one of the profiling heads may include a number of rotatable cutting elements. Steering rolls or other log stabilizers may be used at the log exit.

A further aspect of the invention is directed to a log steering assembly for use with a log processor of the type having a stationary frame. The log steering assembly includes first and second chain assemblies movably mounted to the frame on opposite sides of the feed line of the log processor for movement toward and away from and at angles relative to the feed line. Each chain assembly includes a chain support and a continuous loop, log-engaging chain mounted to the chain support and passing along a chain path, the chain path including an elongated log-engaging section. Each chain assembly also includes an angular orientation assembly mounting the chain assembly to the frame at a selected angular orientation relative to the feed line. The log steering assembly may also include a differential gap assembly coupling the angular orientation assemblies to one another and biasing the log engaging sections towards an initial separation. The angular orientation assembly may include first and second bell cranks, each bell crank connected to the chain support and to the frame, and an adjustable link connecting the bell cranks so that changing the length of the link changes the relative angular orientation of the bell cranks and thus the angular orientation of the chain support.

Other features and advantage of the invention will appear from the following description in which the preferred embodiments have been set forth in detail in conjunction with the accompanying drawings.

BRIEF DESCRIPTION OF THE DRAWINGS

FIGS. 1 and 1A are simplified schematic side and top views of a log processor made according to the invention;

FIG. 2D is similar to FIG. 2B but shows the orientation of the various components engaging a curved log, indicted by its curved centerline;

FIGS. 2E, 2F, 2G and 2H are cross sectional views of a log taken at corresponding positions in FIG. 2D, that is at the first, second and third datum points and after having passed through the saw;

FIGS. 10A, 10B, and 10C illustrate a straight, generally constant diameter log, a curved log and a tapered log respectively; and FIGS. 11A–11F illustrate various sawing schemes of logs of different diameters and of the same diameter.

DESCRIPTION OF THE SPECIFIC EMBODIMENTS

Figure 2A:
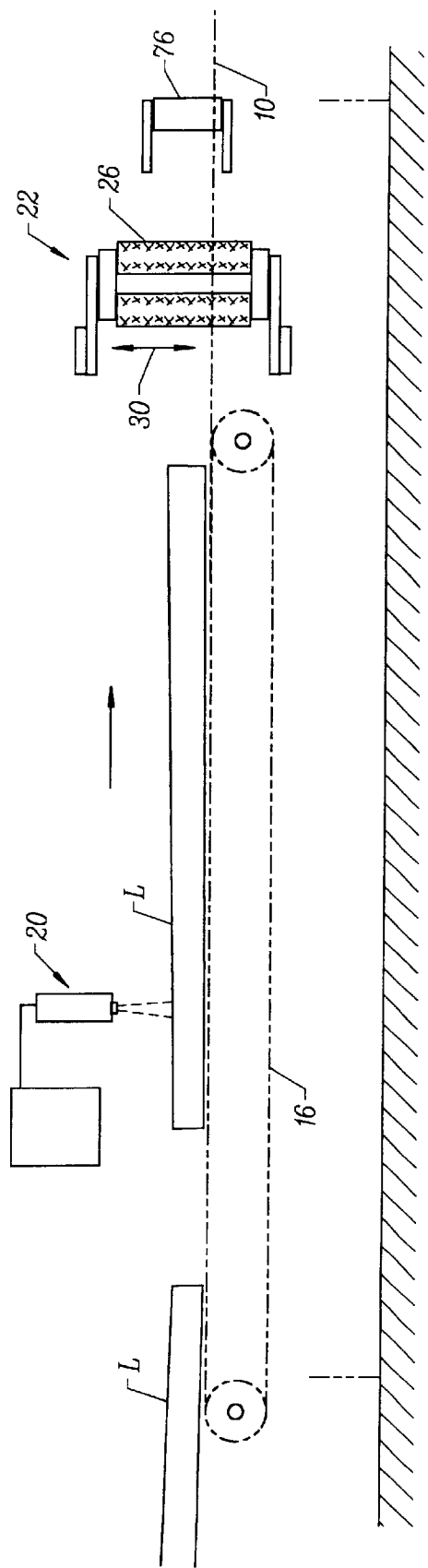
FIGS. 2A and 2B constitute an enlarged, somewhat more detailed side view of the log processor of FIG. 1.
Figures 2B, 2C:
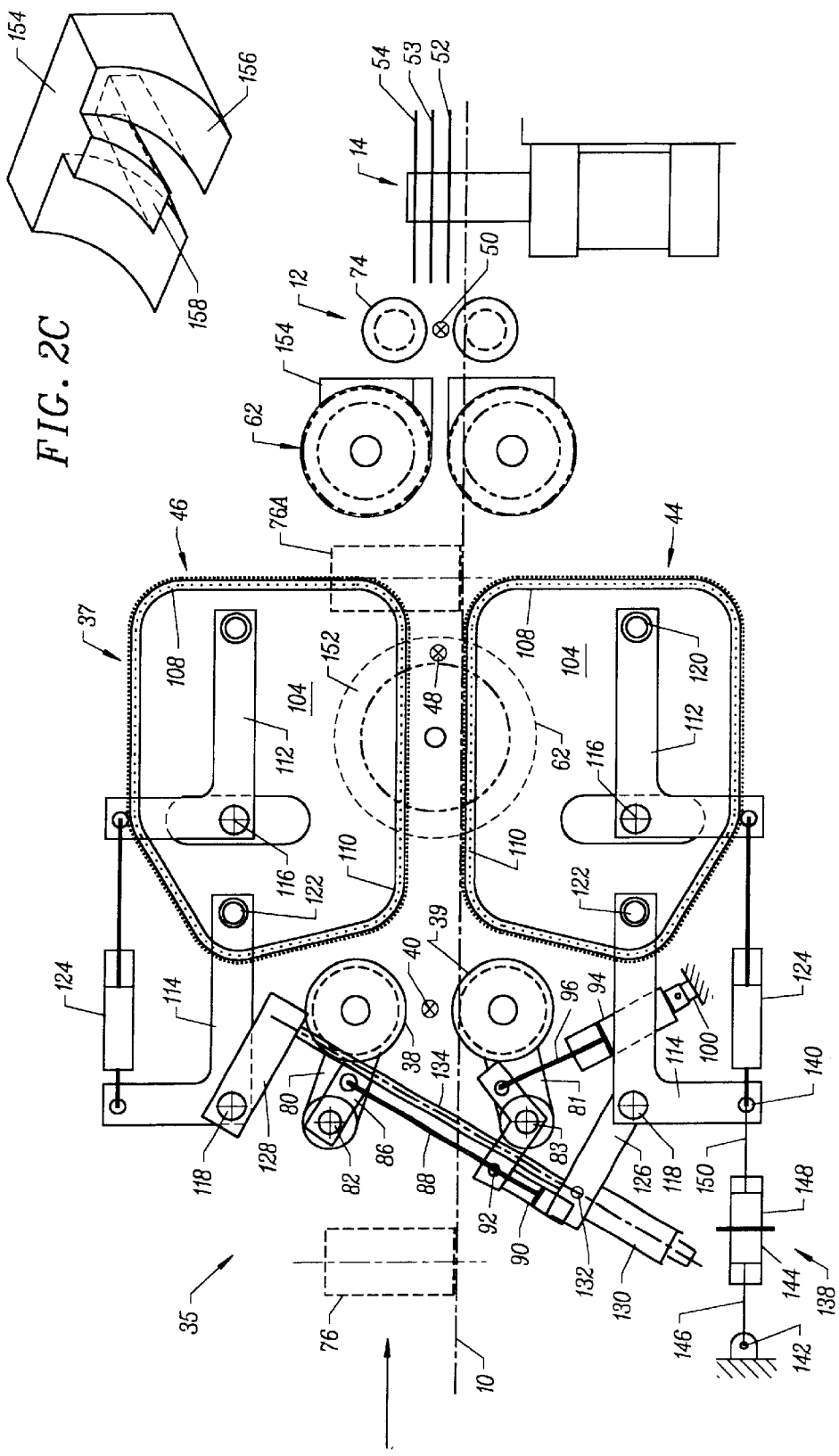
FIG. 2C is an enlarged isometric view of one of the anvils of FIG. 2B.
Figure 3:
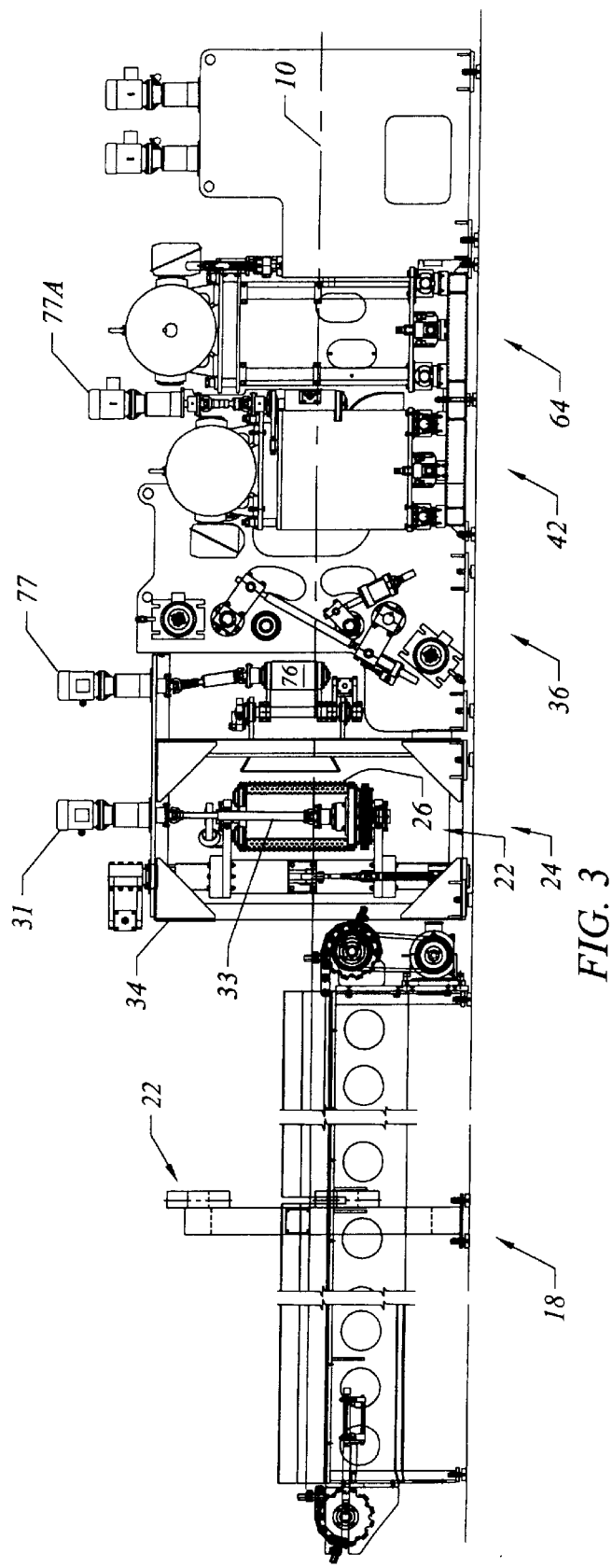
FIGS. 3 and 3A are side elevational and top plan views of a log processor made according to the invention; these two figures correspond to FIGS. 1 and 1A.
Figure 3A:
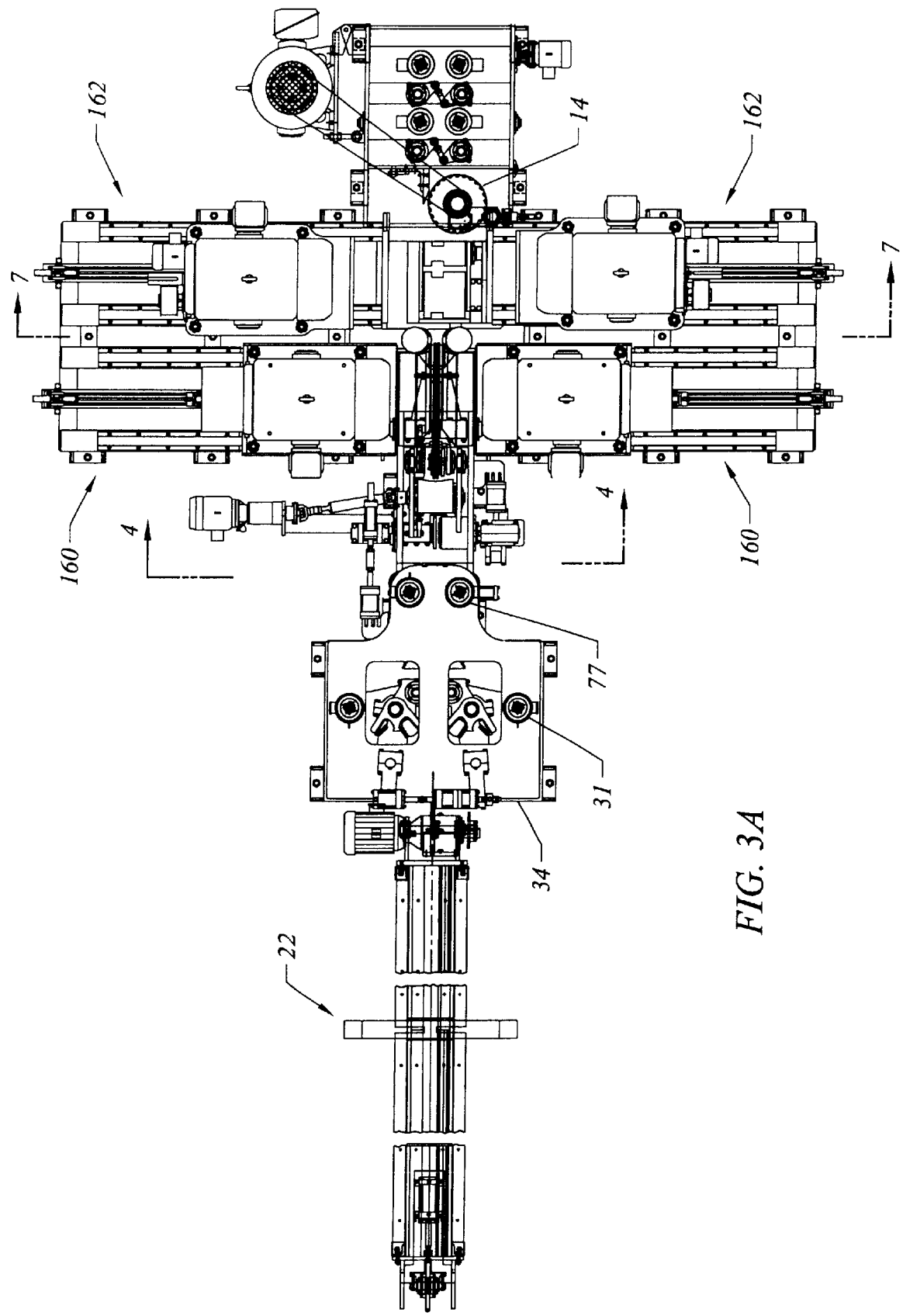
Figure 4:
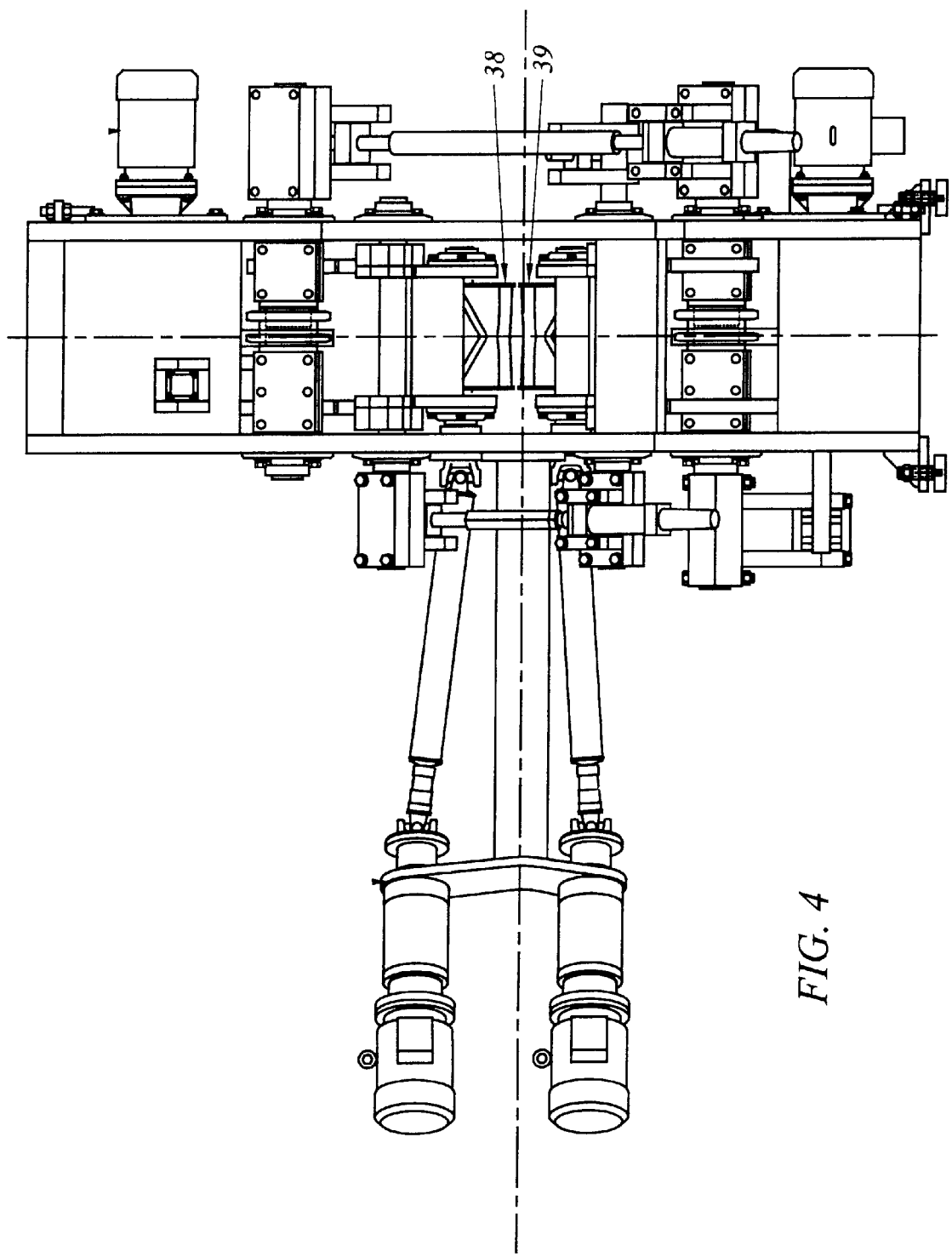
FIG. 4 is a front elevational view taken generally along line 4—4 of FIG. 3A showing the differential centering rolls and their associated drive motors.

FIGS. 1 and 1A illustrate simple schematic side and top views of a log processor 2 made according to the invention. FIGS. 2A and 2B are somewhat more detailed, although still simplified, illustrations of the log processor of FIG. 1 while FIGS. 3 and 3A are side and top views corresponding to FIGS. 1 and 1A of an actual log processor made according to the invention.

Broadly, log processor 2 includes a controller 4, a log conveyor assembly 6, various components of which are coupled to controller 4, having a log entrance 8 at one end of a feed line 10 and a log exit 12 at the other end of the feed line. A saw 14 is located adjacent to and downstream of log exit 12.

The entire operation of log processor 2 can be under the full or partial control of controller 4. User inputs to controller 4 may include such factors as feedspeed, maximum allowable log curvature to solve for, maximum allowable log diameter to be processed and board pattern solutions. Controller 4 may be a conventional type of controller designed for saw mill operations. Examples of such controllers include those made by Allen Bradley of Rockwell Automation as Programmable Logic Controllers (PLC) and IBM compatible computers running customized software, written by MPM Engineering specifically for these applications. The order of control is as follows:

1. Optical scanners send data to a Scanner Server (IBM compatible computer) where a log model is generated.
2. That data is then transferred to an Optimizer Server (IBM compatible computer) where the model is analyzed for the optimum solution of board products, based on user input parameters such as width, thickness, length, sweep and wane allowance.
3. Based on the Optimizer solution, data is then transferred to the PLC (Programmable Logic Controller), which in turn issues commands to the machinery positioning devices.

Log conveyor assembly 6 includes a feed conveyor 16 extending from log entrance 8, past a first station 18 at which a log scanner 20 is located. The conveyor 16 and log scanner 20 are generally conventional, log scanner 20 being of the type that takes a 360° scan of log L as it passes scanner 20. Hermary Opto of MPM Engineering and CAE of Canadian Aviation Electronics Inc sell such scanners.

Next along feed line 10 is a log-orienting assembly 22 located at a second station 24 along feed line 10. Log-orienting assembly 22 includes two pairs of turning rolls 26 which are rotated around their axes 28 and can be moved vertically, that is parallel to axes 28 as indicated by arrows 30. Note that each turning roll 26 of each pair rotates and moves axially in unison. However, one pair of turning rolls 26 on one side of feed line 10 moves vertically independently of the turning rolls of the other side of the feed line. This permit the orienting of curved or swept log L to any desired orientation, such as the "horns up" orientation as indicated in FIGS. 1 and 1A. Lying on feed conveyor 16, the sweep lies in a horizontal plane. Log orienting assembly 22 rotates the log about its own centerline 32 by the vertical movement of turning rolls 26 of one set in the opposite direction as the turning rolls of the other set. Of course log orienting assembly 22 could be used to orient log L in any desired orientation, such as "horns down", which would be 180° opposite of the position of log L at second station 24 of FIG. 1.

Log orienting assembly 22 is generally conventional. However, motors 31, see FIGS. 3 and 3A, which rotate turning rolls 26 are mounted to a stationary frame 34 of log conveyor assembly 6 and are coupled to turning rolls 26 by telescoping drive shafts 33 so that motors 31 do not move axially width the turning rolls. Therefore axial movement response of the turning rolls may be improved because the mass of the rotating motors need not move with the turning rolls.

The invention also includes first and second log positioners 35, 37. First log positioner 35 is a differential centering assembly 35 and is located at a third station 36. Assembly 35 includes a pair of generally horizontally oriented differential centering rolls 38, 39 which operate, as will be discussed below, to cause the longitudinal centerline 32 of log L to remain centered between differential centering rolls 38, 39 at a first datum point 40. Datum point 40 moves relative to feed line 10, which is fixed, primarily according to the size of log L and the location and shape of centerline 32. Second log positioner 37 is a differential steering chain assembly 37 and is located at a fourth station 42. Assembly 37 includes first and second chain assemblies 44, 46. Chain assemblies 44, 46 are located and oriented so to cause longitudinal centerline 32 of log L to be aligned with a second datum point 48 located between chain assemblies 44, 46. The locations of datum points 40, 48 are chosen and continuously adjusted, as needed, as log L moves along feed line 10, so that saw blade paths 56 (see FIGS. 5C and 6B) of log L are parallel to feed line 10 at a third datum point 50, third datum point 50 being aligned with log exit 12. Doing so helps ensure that log L properly engages one or more of saw blades 52, 53, 54 of saw 14, the saw blades being parallel to feed line 10. With constant-diameter logs (FIG. 10A) and tapered logs (FIG. 10C) undergoing a split-taper sawing solution (FIGS. 5A, 5B), longitudinal axis 32 is generally parallel to feed line 10 so that saw blade paths 56 (see FIG. 5C) is generally parallel to centerline 32. However, some sawing techniques, such as full tapering saw (See FIGS. 6A, 6B), the saw blades are parallel to one edge of log L and at angle to longitudinal centerline 32 so that saw blade paths 56A are not parallel to centerline 32.

Continuing with this overview of log processor 2, the lateral sides of log L are removed by a pair of side chipping heads 58 having effectively flat cutting surfaces 60 (FIG. 1A), chipping heads 58 being located on either side of chain assemblies 44, 46 at fourth station 42. After log L passes between side chipping heads 58, log L is transformed into what is called a cant. However, for simplicity of the nomenclature, the work piece, that is log L, will typically be referred to as a log as opposed to a cant or other processed log designation. The upper and lower sides of log L are processed as they past between lower and upper profiling heads 62 located at a fifth station 64 between fourth station 42 and log exit 12. Log profiling heads 62 include a number of cutting elements which are rotated about their profiling head axes 66. Each profiling head 62 can have different diameters according to the configuration or profile desired to be formed in log L. Profiling heads 62 each include larger diameter cutting surfaces 68, 70 on either side of a smaller diameter cutting surface 72 which can create the stepped surface profiles shown in FIGS. 9A and 9B and the flat surface profile shown in FIG. 9C.

A pair of steering rolls 74 are located at log exit 12 on either side of third datum point 50 between profiling heads 62 and saw 14. Steering rolls 74 preferably have outer surfaces shaped to correspond to the typically stepped surfaces created in log L by profiling heads 62. Stepped rolls 74 are vertically adjustable as to position and are driven about their axes to not only help position and stabilize log L as it enters saw 14 but also drive log L into saw 14. Referring now primarily to FIGS. 2A–2D, additional aspects of log processor 2 will be discussed. Turning rolls 26 are moveable vertically and are rotated to drive log L along feed line 10. After log L passes through log orienting assembly 22, log L is laterally positioned by a pair of rotating edge guide rolls 76 which are rotated by motors 77. Edge guide rolls are biased towards one another and coupled together so that rolls 76 center log L on a vertical plane passing through feed line 10.

Turning now primarily to FIG. 2B, the components downstream of edge guide rolls 76 are shown. FIG. 2B illustrates assembly 35, including differential centering rolls 38, 39, in the position it occupies relative to assembly 37, including chain assemblies 44, 46. Rolls 38, 39 are respectively mounted to arms 80, 81, arms 80, 81 being mounted to frame 34 at respective fixed pivot points 82, 83. Note that the fixed pivot points in FIGS. 2B–2D are indicated by a cross at the pivot points. A bell crank 84 is also pivotally mounted to frame 34 at fixed pivot point 83. Bell crank 84 is fixed to arm 81 so that both bell crank 84 and arm 81 rotate together. Likewise, an arm 86 is pivotally mounted to fixed pivot point 82 and is fixed to arm 80 so that arm 80 and arm 86 rotate together about pivot point 82. Bell crank 84 and arm 86 are secured to one another by a rod 88 extending from a hydraulic cylinder 90; the hydraulic cylinder is pivotally mounted to bell crank 84 at a pivot 92. Movement of rod 88 out of and back into cylinder 90 causes rod 88 to extend and retract, respectively. This movement of rod 88 has a tendency to cause bell crank 84 and thus arm 81 to pivot about fixed axis 83 and also has a tendency to cause arm 86 and arm 80 therewith to pivot about fixed axis 82.

The preferred embodiment of log processor 2 is designed so that the smallest diameter of the lower differential centering roll 39 is aligned with feed line 10. This positioning is achieved using a pneumatic cylinder 94 from which a piston rod 96 extends. The distal end of piston rod 96 is pivotally mounted to bell crank 84 at a pivot point 98 on bell crank 84. The opposite end of cylinder 94 is pivotally mounted to frame 34 at mounting location 100. Thus, due to the resistance of pneumatic cylinder 94, extension of rod 88 causes upper differential centering roll 38 to move upwardly away from lower differential centering roll 39 to permit the initial spacing between the differential centering rolls to be achieved through hydraulic cylinder 90. Assume, for example, that the smallest diameter log is expected to be four inches, then the distance between the centers of the outer surfaces of rolls 38 will typically be set for four inches through hydraulic cylinder 90. Assuming the smallest diameter log which is expected changes to five inches, hydraulic cylinder 90 is actuated to extend rod 88 causing upper differential centering rolls 38 see corrections to pivot upwardly while pneumatic cylinder 94 maintains lower roll 39 aligned with feed line 10 as shown in FIG. 2B. However, as logs pass between differential centering rolls 38, 39, differential centering rolls 38, 39 move towards and away from one another equal distances to accommodate different diameters of the logs. This movement towards and away from one another is accommodated by movement of rod 96 into and out of pneumatic cylinder 94.

First and second chain assemblies 44, 46 are part of a differential steering chain assembly 37. First and second chain assemblies are generally mirror images of one another so that only first chain assembly 44 will described in detail. First chain assembly 44 includes a chain support 104 which supports a continuous loop log-engaging chain 106, chain 106 passing along a circumferential chain path 108. Chain path 108 includes an elongate, log-engaging section 110. As shown in FIG. 2B, log-engaging section 110 typically lies adjacent to feed line 10 at a rest position. First chain assembly 44 also includes a pair of bell cranks 112, 114 pivotally mounted to frame 34 at fixed pivots 116, 118 and to chain support 104 at pivots 120, 122. The opposite ends of bell cranks 112, 114 are connected by a linear actuator 124 which can be extended or contract to change the angular orientation of chain support 104 and thus the angle of section 110.

Bell crank arms 114 for first and second chain assemblies 44, 46 have an arm 126, 128 rigidly extending therefrom. That is, arm 126 is rigidly secured to and rotates with bell crank 114 for first chain assembly 44 and arm 128 is fixed to and rotates with arm 114 for second chain assembly 46. A hydraulic cylinder 130 is pivotally secured to arm 126 at pivot 132 while the distal end of a piston rod 134, which extends from cylinder 130 and acts as a variable length link, is pivotally connected at its distal end to arm 128 at pivot 136. Extending and retracting piston rod 134 acts to raise and lower second chain assembly 46 relative to first chain assembly 44 setting the initial separation between sections 110 at chain path 108. Accordingly, arms 126,128, hydraulic cylinder 130 and piston rod 134 act to change the elevation of second chain assembly 46 relative to first chain assembly 44. The initial or nominal separation between sections 110 of chain paths 108 for the two chain assemblies as well as additional separation caused by passing of log L between the chain assemblies is accomplished by establishing a distance between pivot 132 and 136.

The initial elevation of the first chain assembly 44 is achieved by using a dual actuator 138 coupling a pivot 140 on the bell crank 114 of first chain assembly 44 and a pivot 142 mounted to frame 34. Dual actuator 138 includes a hydraulic cylinder portion 144 from which a hydraulic cylinder rod 146 extends and connects to pivot 142. Actuation of hydraulic cylinder portion 144 causes the bell crank 114 for first chain assembly 44 to rotate in a first direction and bell crank 114 for the second chain assembly to rotate in an opposite direction thus changing the separation between the two chain assemblies. Therefore, using hydraulic cylinder portion 144 to set the initial elevation of chain assembly 44 relative to differential roll 39 and adjusting cylinder rod 134 of cylinder 130 to position chain assembly 46, the separation between sections 110 of chain path 108 can be achieved. The other half of dual actuator of 138 includes a pneumatic cylinder 148 from which a pneumatic cylinder rod 150 extends to connect with pivot 140. Assuming the initial separation between sections 110 is set to accommodate the smallest expected diameter of log L, larger diameter of logs passing there between are accommodated by the compression of the air or other gas within pneumatic cylinder 148, which acts as a spring. Pneumatic cylinder 148 tends to bias sections 110 back to their initial, minimum log diameter separation.

Figure 8:
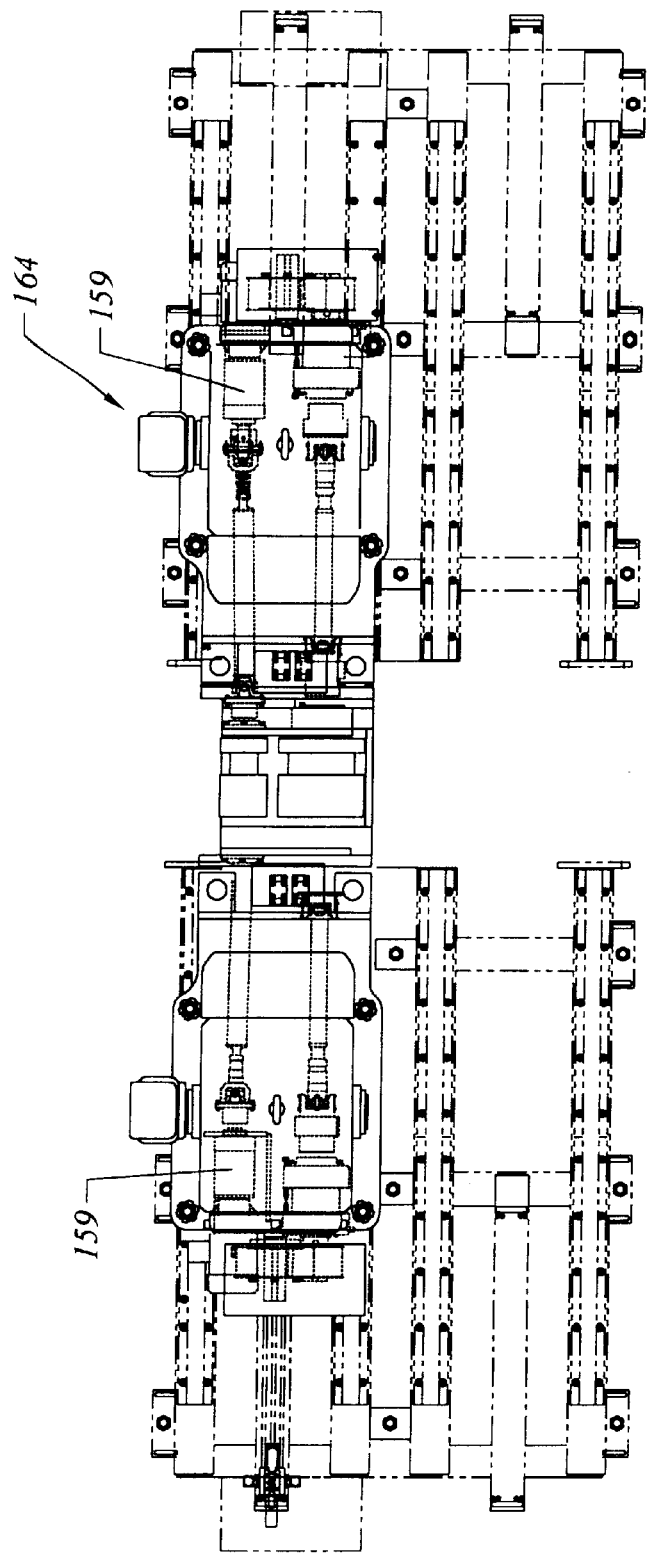
FIG. 8 is an enlarged somewhat simplified plan view showing the upper profiling head and steering roll assembly mounted to a track, the profiling heads and steering rolls being rotated by stationary motors through pivotal and extendable length drive shafts to accommodate the vertical movement of the profiling heads and steering rolls.

As shown in FIG. 2B, each profiling head 62 creates an annular cutting path 152 so that the sides of log L are cut while securely secured between chains 106. See FIG. 2G. A second set of stabilizing, edge guide rollers 76A, similar to roller 76, are used just downstream of second datum point 48 to help drive and stabilize the log as it is driven along feed line 10. Anvils 154 are used just downstream of profiling heads 62 to help stabilize the log, see FIG. 2H, as it leaves the profiling heads. Anvils 154, see FIG. 2C, have surfaces 156, 158 which are positioned close to the surfaces of revolution created by the cutting elements of profiling heads 62. Steering rolls 74 are driven about their axes by motors 159 (see FIG. 8) and have surfaces which contact log L as it passes anvils 154.

With the disclosed embodiment, log L is transformed from a generally cylindrical cross sectional shape, see FIG. 2E, at third station 36 to a cant, that is with flat lateral sides, as shown in FIG. 2F, at fourth station 42 by the chipping action of side chipping heads 58, and then to the general X-cross sectional shape as shown in FIG. 2G after passing between profiling heads 62. FIG. 2H illustrates the result of sawing the X-cross sectional shaped log of FIG. 2G into three different boards using saw blades 52, 53 of saw 14.

FIG. 2B illustrates the general arrangement of the components of log processor 2 at third, fourth and fifth stations 36, 42 and 64 for a straight, constant-diameter log. FIG. 2D shows the various components as they would be when engaging a curved or swept log in a "horns-up" orientation. More specifically, FIG. 2D illustrates rolls 38 of differential centering assembly 35 in their initial positions, the vertical shifting and rotation of chain supports 104 of assembly 37, the vertical movement of profiling heads 62 and anvils 154 therewith, the vertical positioning of steering rolls 74, and the vertical positioning of saw blades 52, 53 and 54. In this example the shifting of the various components accommodates a curved log having a curved centerline 32. Differential centering rolls 38, chain assemblies 44, 46 and steering rolls 74 have their positions continuously adjusted to ensure centerline 32 passes through first, second and third datum points 40, 48 and 50 and to ensure that saw blade paths 56 are generally parallel to feed line 10 (and to saw blades 52–54) at log exit 12. The vertical positions of the saw blades 52, 54 of saw 14 are also adjusted so that they are in the proper locations to engage the log as it passes from steering rolls 74. While steering rolls 74 are used to properly position log L, the positioning of the log is initially accomplished by differential centering assembly 35 and differential steering chain assembly 37; only after the log reaches third datum point 50 between steering rolls 74 do steering rolls 74 begin to steer or guide the log.

In the disclosed embodiment log L is actively positioned at all three datum points 40, 48 and 50, initial positioning of log L (before reading fifth station 64) is accomplished using only datum points 40, 48 while later positioning of the log (after leaving third station 36) is accomplished using only datum points 48, 50. Additional positioning structure for one or more additional datum points could also be used. It may also be possible to use only two datum points.

To promote accessibility to various components shown in FIG. 2B, tracks 160, 162 (see FIGS. 3A and 8) are used on either side of feed line 10. Tracks 160 are used to support and locate side chipping heads 58 while tracks 162 are used to support the upper profiling head 62, anvil 154 and steering roll 74 on one side and the lower profiling head 62 and steering roll 74 on the other side of feed line 10.

Figure 9A:
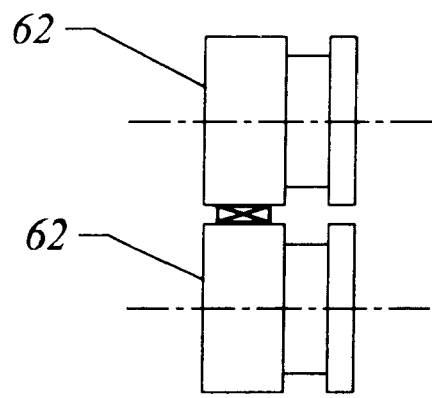
FIGS. 9A, 9B, and. 9C illustrate the profiling heads of FIG. 8 at three different sets of lateral positions to create logs with three different cross-sectional shapes.
Figure 9B:
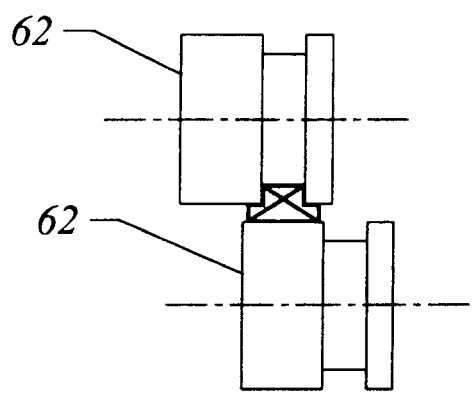
Figure 9C:
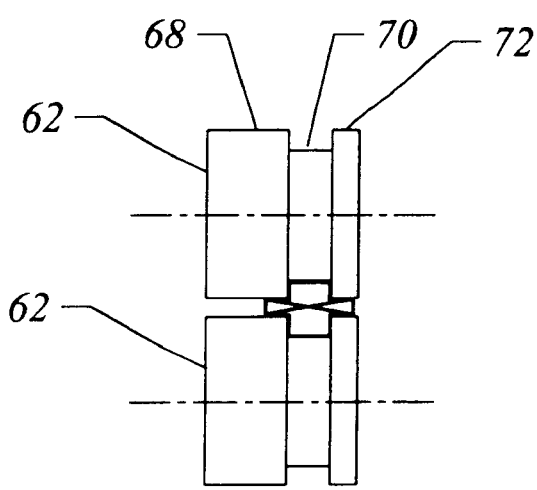

FIG. 9A illustrates profiling heads 62 shown in the position which they would be used in creating the shape shown in FIG. 2H. FIG. 9B illustrates the axial movement of one of the profiling heads relative to the other which create a different cross sectional shape while FIG. 9C illustrates shifting both of the profiling heads to create a still further cross sectional shape. This shifting of profiling heads 62 is accomplished by the movement of upper and lower steering roll/profiling head assembly 164 along assembly track 166 (see FIG. 8). Of course other shapes of profiling heads could also be used.

FIG. 10A illustrates a straight log. FIG. 10B illustrates a curved or swept log while FIG. 10C illustrates a tapered log. Note that a single log could include a combination of two or more of these shapes. For example, a log could be partially straight, partially curved and have all or part of its length tapered.

FIGS. 11A–11F illustrate different cutting schemes for different sizes of logs and different cutting schemes for the same size log. The chosen cutting scheme depends on what type of lumber or other product is needed and the characteristics of the log. The FIGS. 11A and 11D examples could be produced without the need for using saw 14; however, it still may be desired to pass the work piece through the saw to, for example, clean up the edges.

Figure 5A:
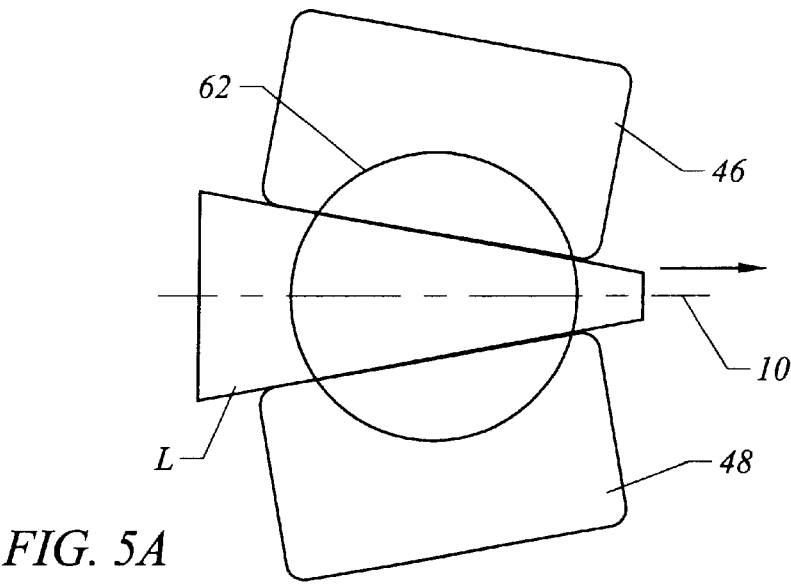
FIGS. 5A and 5B illustrate, in simple form, the positioning of the chain assemblies where a split taper sawing solution with the top or head or small end leading in the FIG. 5A embodiment and the bottom or base or large end leading in the FIG. 5B embodiment.
Figure 5B:
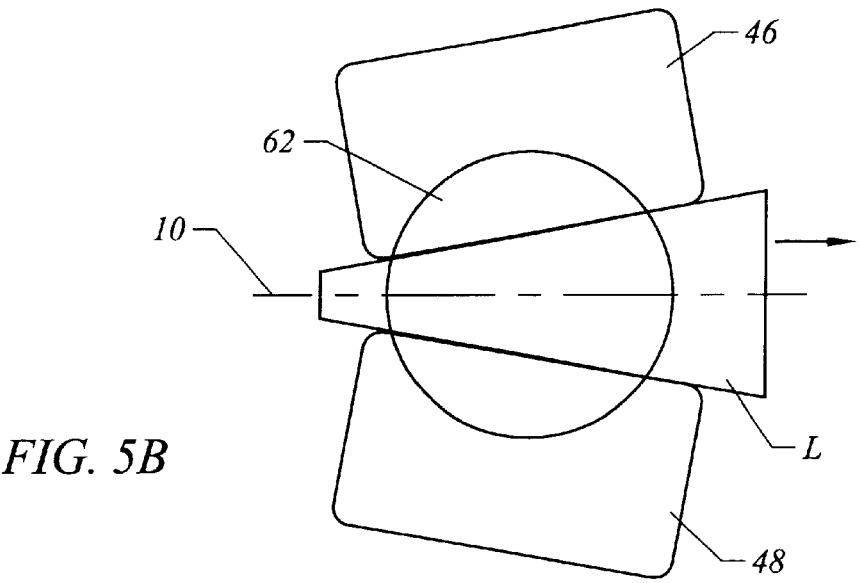
Figure 5C:
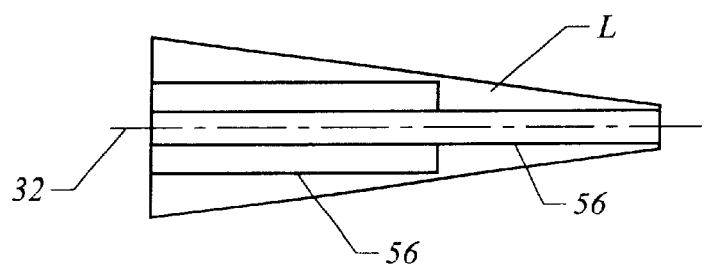
FIG. 5C illustrates the saw blade paths for a split taper solution.

FIGS. 5A and 5B illustrate, in a simple schematic form, the orientation for first and second chain assemblies 44, 46 when log L is a tapered log in a top first orientation (FIG. 5A) or a base first orientation (FIG. 5B) in a split taper solution. FIG. 5C illustrates a typical split taper solution in which saw blade path 56 is parallel to longitudinal centerline 32 of log L. As indicated in FIG. 5C, one long board and two shorter boards are to be cut from the log.

Figure 6C:
FIG. 6C shows a variable taper board solution within a log.
Figure 6B:
FIG. 6B illustrates the saw blade paths for a full taper sawing solution.
Figure 6A:
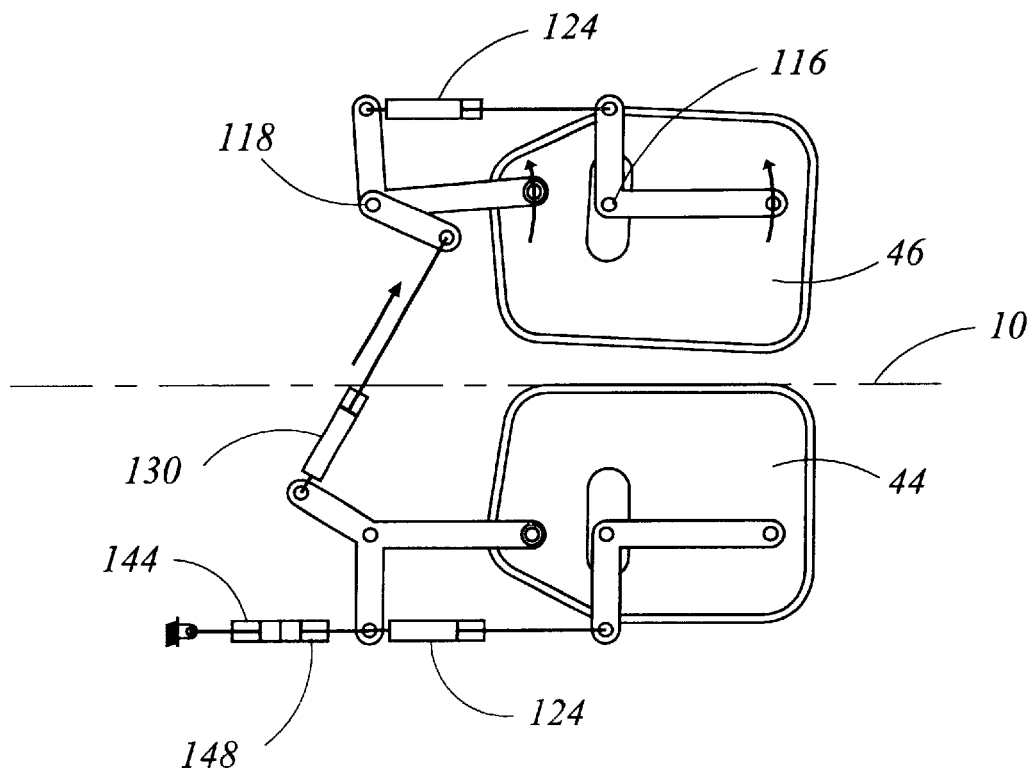
FIG. 6A illustrates the positions of the chain assemblies for a full taper sawing solution.
Figure 7:
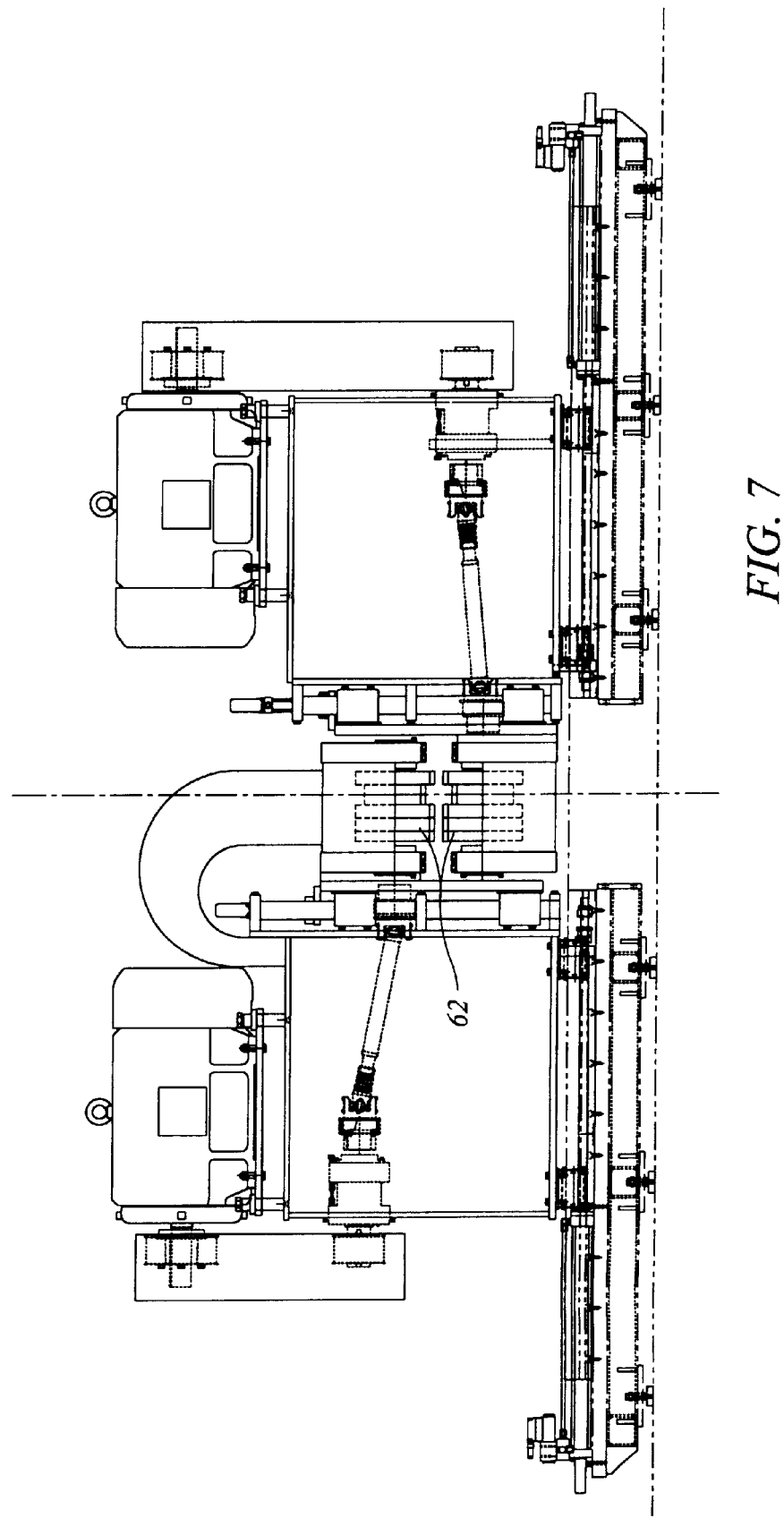
FIG. 7 is a view taken along the line 7—7 of FIG. 3A illustrating the profiling heads and their associated drive motors mounted on tracks.

FIG. 6A illustrates the positions and orientations of first and second chain assemblies 44, 46 when the cutting scheme is a full taper solution so that one edge of the log is generally parallel to feed line 10. Saw blade path 56A remains parallel to feed line 10 but is not parallel to centerline 32 of the log. In this embodiment section 110 of chain path 108 of first chain assembly 44 is located parallel to and generally coextensive with feed line 10 while second chain assembly 46 moves away from first chain assembly 44 as indicated by the arrows as the log passes between the two chain assemblies. To accommodate this type of action, that is where only second chain 46 moves and first chain assembly 44 remains essentially stationary, the controller causes the setworks cylinder 130 to extend at the taper rate of the log, while maintaining the position of cylinder 144 and cylinders 124. Subtracting the small end diameter of the log from the large end diameter of the log and dividing the difference by the length of the log determines the taper rate.

Variable taper sawing between the split taper sawing of FIGS. 5A and 5C and the full taper sawing of FIGS. 6A and 6B is also possible as shown in FIG. 6C, where neither edge of the log is parallel to feed line 10. Saw blade path 56A remains parallel to feed line 10 but is not parallel to centerline 32 of the log.

In use, a log L is place upon feed conveyor 16, typically from the side, at log entrance 8. Feed conveyor 16 moves log L along feed line 10, past log scanner 20 where the log profile is determined. Based upon various input factors provide to controller 4 by the user, such as board width, board thickness, board length, maximum allowable curvature per board length and multiple wane allowances, a sawing scheme for the log is determined by controller 4. Log-orienting assembly 22 engages log L and orients the log generally along feed line 10 with longitudinal centerline 32 oriented with respect to a chosen plane. The log is engaged by differential centering assembly 35 and then by differential steering chain assembly 37 which adjust the position of longitudinal centerline 32 of the log so that when the log passes log exit 12 along feed line 10, saw blade path 56 at log exit 12 is generally parallel to feed line 10 and thus to the saw blades. As the log passes third station 36, spaced apart, opposed, generally hourglass-shaped differential placement rolls 38 engage and position the log. The angular orientation of at least one of log engaging sections 110 of first and second chain assemblies 44, 46 may be changed to enhance the contact between the log engaging sections and the log. Thereafter, the log continues between log chipping profiling heads 62 at fifth station 64 and then past steering rolls 74 to stabilize the log at log exit 12. Profiling heads 62, steering rolls 74 and saws 14 are all vertically moveable to ensure that the log is supplied to the saw with saw blade paths 56 generally parallel to feed line 10 to minimize the kerf, reduce wear on the saw blades and help prevent damage to the saw blades.

Modifications and variation can be made to the disclosed embodiment without departing from the subject of the invention as defined in the following claims.

Any and all patents, patent applications and printed publications referred to above are hereby incorporated by reference.

What is claimed is:

1. A method for processing a log comprising:
    passing a log along a feed line from a log entrance to a log exit;
    scanning the log at a first station along the feed line;
    determining a longitudinal centerline and a sawing scheme for the log based at least in part on the results of the scanning step, the sawing scheme comprising a longitudinal-extending saw blade path through the log;
    orienting the log at a second station along the feed line with the longitudinal centerline oriented with respect to a chosen plane;
    engaging the log at third and fourth stations along the feed line;
    adjusting the position of the longitudinal centerline relative to the feed line and the chosen plane at the third and fourth stations so that the saw blade path at the log exit is generally parallel to the feed line as the log passes the log exit; and
    driving the log past a saw at or adjacent to the log exit to create at least one sawed product,
    wherein the sawing scheme determining step includes selecting whether or not to do variable taper sawing and then, if variable taper sawing is selected, choosing a variable taper sawing scheme from split taper sawing to full taper sawing, inclusive.

2. The method according to claim 1 wherein the selecting step is carried out to do split taper sawing for a generally straight log so that the longitudinal centerline is parallel to the feed line.

3. The method according to claim 1 wherein the selecting step is carried out to do full taper sawing for a generally straight log so that one edge of the log is parallel to the feed line.

4. The method according to claim 1 wherein the determining step determines a constant-radius centerline, wherein the determining step determines an infinite constant-radius centerline when the log is straight and a finite constant-radius centerline when the log is curved.

5. The method according to claim 1 wherein the position adjusting step comprises:
    positioning spaced-apart, opposed differential placement elements at least a chosen one of the third and fourth stations to define an initial separation; and
    engaging the log as the log passes the chosen station by the differential placement elements causing the differential placement elements to separate, wherein the differential placement elements separate unequal distances as the log passes the chosen station to accommodate variable taper sawing.

6. The method according to claim 1 wherein the position adjusting step comprises:
    positioning spaced-apart, opposed differential placement elements at least a chosen one of the third and fourth stations to define an initial separation; and
    engaging the log as the log passes the chosen station by the differential placement elements causing the differential placement elements to separate, wherein:
    the positioning step is carried out using differential steering chain assemblies as the differential placement elements, the chain assemblies each comprising a continuous loop log-engaging chain having an elongate log-engaging section; and
    the engaging step includes engaging the log by each log-engaging section.

7. The method according to claim 6 further comprising the step of selectively changing the angular orientation of at least one of said elongate log-engaging sections to enhance the contact between the log-engaging sections and the log.

8. The method according to claim 1 wherein the orienting step is carried out using axially-shiftable turning rolls on opposite sides of the feed line, wherein the log orienting step comprises rotating the turning rolls using motors mounted to a stationary frame and not axially movable with the turning rolls, whereby axial movement response of the turning rolls may be improved.

9. The method according to claim 1 further comprising stabilizing the log at the log exit, wherein the log stabilizing step comprises moving a log stabilizer along a path generally parallel to the chosen plane and transverse to the feed line.

10. A method for processing a log comprising:
passing a log along a feed line from a log entrance to a log exit;
scanning the log at a first station along the feed line;
determining a longitudinal centerline and a sawing scheme for the log based at least in part on the results of the scanning step, the sawing scheme comprising a longitudinally-extending saw blade path through the log;
orienting the log at a second station along the feed line with the longitudinal centerline oriented with respect to a chosen plane;
engaging the log at third, fourth and fifth stations along the feed line;
adjusting the position of the longitudinal centerline relative to the feed line and chosen plane at the third and fourth stations so that the saw blade path at the log exit is generally parallel to the feed line as the log passes the log exit;
the position adjusting step comprising:
  engaging the log as the log passes the third station by spaced-apart, opposed generally hourglass-shaped differential placement rolls causing the differential placement rolls to separate;
  engaging the log as the log passes the fourth station by elongate log-engaging sections of spaced-apart, opposed differential steering chain assemblies at the fourth station, the chain assemblies each comprising a continuous loop log-engaging chain having said elongate log-engaging section; and
  changing the angular orientation of at least one of said elongate log-engaging sections to enhance the contact between the log-engaging section and the log;
  passing the log between log-chipping profiling heads at the fifth station, the profiling heads having cutting surfaces at different positions relative to the feed line;
stabilizing the log at the log exit; and
driving the log past a saw following the log exit to create at least one sawed product.

11. A log processor comprising:
a controller;
a log conveyor assembly, operably coupled to the controller, by which a log is moved from a log entrance, at which the log is introduced to the conveyor assembly at a first end of a feed line, to a log exit at a second end of the feed line, the log conveyor assembly comprising:
  a log scanner, at a first station along the feed line and coupled to the controller, which provides information to the controller so the controller can determine a longitudinal centerline and a sawing scheme for the log based at least in part upon the cross-sectional size and any longitudinal curve to the log, the sawing scheme comprising a longitudinally-extending saw blade path through the log;
  a log-orienting assembly at a second station alone the feed line configured to orient the scanned log to a chosen orientation with the longitudinal centerline oriented with respect to a chosen plane; and
  first and second log positioners situated at third and fourth stations along the feed line and operably coupled to the controller so the log positioners continuously position the log as the log passes through the third and fourth stations, so that as the log passes the log exit, the saw blade path is generally parallel to the feed line; and
a saw at or adjacent to the log exit, wherein:
  the log conveyor assembly comprises a stationary frame;
  the log-orienting assembly comprises axially-shiftable, rotatable turning rolls on opposite sides of the feed line mounted to the frame for rotation about their axes by a first drive and for axial shifting along their axes by a second drive;
  the first drive comprising a motor secured to the frame so that the motor does not move axially with the turning rolls whereby axial movement response of the turning rolls may be improved.

12. The log processor according to claim 11 wherein the second log positioner comprises:
first and second chain assemblies movably mounted to the frame on opposite sides of a feed line of the log processor for movement towards and away from and at angles relative to the feed line, each chain assembly comprising:
a chain support;
a continuous loop log-engaging chain mounted to the chain support and passing along a chain path, the chain path including an elongate, log-engaging section; and
an angular orientation assembly supportably mounting the chain assembly to the frame at a selected angular orientation of the log-engaging section relative to the feed line; and
a differential gap assembly coupling the angular orientation assemblies to one another and biasing the log engaging section towards an initial separation, said differential gap assembly coupling said chain assemblies together so that further separation of the log-engaging sections by a log passing therethrough causes at least one of said log-engaging section to move relative to the feed line as at least a part of each of the log-engaging portions engage the log, wherein the differential gap assembly comprises:
  a differential gap linkage coupling said chain supports through said angle orientation assemblies so that the log-engaging sections move generally equal distances relative to the feed line when the distance therebetween is changed.

13. The log processor according to claim 12 wherein the angular orientation assembly comprises:
first and second bell cranks, each bell crank connected to the chain support and to the frame;
an adjustable-length link connecting the first and second bell cranks;
whereby changing the length of the adjustable-length link changes the relative angular orientations of the bell cranks and the angular orientation of the chain support.

14. The method according to claim 10 wherein the sawing scheme determining step includes selecting whether or not to do variable taper sawing and then, if variable taper sawing is selected, choosing a variable taper sawing scheme from split taper sawing to full taper sawing, inclusive.

15. The method according to claim 14 wherein the selecting step is carried out to do split taper sawing for a generally straight log so that the longitudinal centerline is parallel to the feed line.

16. The method according to claim 14 wherein the selecting step is carried out to do full taper sawing for a generally straight log so that one edge of the log is parallel to the feed line.

17. The method according to claim 10 wherein the orienting step is carried out with the chosen plane being a vertical plane.

18. The method according to claim 10 wherein the log orienting step is carried out so the centerline is aligned with the chosen plane and the position adjusting step is carried out so the centerline is positioned within the chosen plane at the third, fourth and fifth stations.

19. The method according to claim 10 wherein the determining step determines a constant-radius centerline.

20. The method according to claim 19 wherein the determining step determines an infinite constant-radius centerline when the log is straight and a finite constant-radius centerline when the log is curved.

21. The method according to claim 10 further comprising chipping opposite sides of the log.

22. The method according to claim 10 wherein the passing step is carried out using profiling leads having cutting surfaces at different positions relative to the feed line.

23. The method according to claim 22 further comprising the step of laterally adjusting the positions of the profiling heads according to the sawing scheme for a log.

24. The method according to claim 22 wherein the passing step includes selectively moving the profiling heads along paths generally parallel to the chosen plane and transverse to the feed line.

25. The method according to claim 10 further comprising the step of positioning the saw to be aligned with the feed line.

26. The method according to claim 10 further comprising the step of adjusting the position of the saw relative to the feed line, the saw having a plurality of saw blades.

27. The method according to claim 10 wherein the orienting step is carried out using axially-shiftable turning rolls on opposite sides of the feed line.

28. The method according to claim 27 wherein the log orienting step comprises rotating the turning rolls using motors mounted to a stationary frame and not axially movable with the turning rolls, whereby axial movement response of the turning rolls may be improved.

29. The method according to claim 10 wherein driving step is carried out with the saw located at a position adjacent to and following the log exit.

30. The method according to claim 10 wherein the log stabilizing step comprises moving a log stabilizer along a path generally parallel to the chosen plane and transverse to the feed line.

* * * * *